(12) United States Patent
Paul

(10) Patent No.: US 11,187,290 B2
(45) Date of Patent: Nov. 30, 2021

(54) ALUMINUM CERAMIC COMPOSITE BRAKE ASSEMBLY

(71) Applicant: Honda Motor Co., Ltd., Tokyo (JP)

(72) Inventor: Scott A. Paul, Plain City, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/264,352

(22) Filed: Jan. 31, 2019

(65) Prior Publication Data

US 2020/0208695 A1 Jul. 2, 2020

Related U.S. Application Data

(60) Provisional application No. 62/786,092, filed on Dec. 28, 2018.

(51) Int. Cl.
| | | |
|---|---|---|
| *F16D 65/12* | (2006.01) | |
| *B22D 19/00* | (2006.01) | |
| *F16D 65/02* | (2006.01) | |

(52) U.S. Cl.
CPC .......... *F16D 65/126* (2013.01); *B22D 19/00* (2013.01); *F16D 65/123* (2013.01); *F16D 2065/132* (2013.01); *F16D 2065/1344* (2013.01); *F16D 2200/003* (2013.01); *F16D 2200/0043* (2013.01); *F16D 2200/0086* (2013.01)

(58) Field of Classification Search
CPC .... F16D 65/123; F16D 65/125; F16D 65/126; F16D 2065/1316; F16D 2065/1348; F16D 2065/1364; F16D 2065/1368; F16D 2065/1376; F16D 2065/136

See application file for complete search history.

(56) References Cited

U.S. PATENT DOCUMENTS

| | | |
|---|---|---|
| 2,708,492 A | 5/1955 | Helsten |
| 3,391,763 A | 7/1968 | Severson |
| 3,732,953 A | 5/1973 | Huet |
| 4,108,286 A | 8/1978 | Gagarin |
| 5,183,632 A | 2/1993 | Kiuchi et al. |

(Continued)

FOREIGN PATENT DOCUMENTS

| | | |
|---|---|---|
| CN | 103807333 | 5/2014 |
| CN | 104204597 | 12/2014 |

(Continued)

OTHER PUBLICATIONS

Machine translation of EP 3524843 (no date).*

(Continued)

*Primary Examiner* — Nicholas J Lane
(74) *Attorney, Agent, or Firm* — Rankin, Hill & Clark LLP

(57) ABSTRACT

A brake assembly for use in a disc brake mechanism of a vehicle. The brake assembly includes an aluminum ceramic composite rotor connected to a central aluminum hub. The rotor includes projections extending radially inward toward the hub and engaging with through holes in the hub. The projections extend through the through holes to connect the rotor to the hub. The engagement between the projections and the through holes allows for radial movement of the projections relative to the through holes, which radial movement may be caused by thermal expansion of the rotor from heat generated during a breaking operation.

15 Claims, 5 Drawing Sheets

(56) References Cited

U.S. PATENT DOCUMENTS

| | | | |
|---|---|---|---|
| 5,503,214 A | 4/1996 | Cribley et al. | |
| 5,509,510 A | 4/1996 | Ihm | |
| 5,620,042 A | 4/1997 | Ihm | |
| 5,620,791 A | 4/1997 | Dwivedi et al. | |
| 5,712,029 A | 1/1998 | Tsugawa et al. | |
| 5,765,667 A | 6/1998 | Ross et al. | |
| 5,878,849 A | 3/1999 | Prunier, Jr. | |
| 5,957,251 A | 9/1999 | Jones et al. | |
| 6,032,769 A | 3/2000 | Daudi | |
| 6,112,398 A | 9/2000 | Messina | |
| 6,139,215 A | 10/2000 | Kuhne et al. | |
| 6,152,270 A * | 11/2000 | Giorgetti | 188/218 XL |
| 6,180,258 B1 | 1/2001 | Klier | |
| 6,214,472 B1 | 4/2001 | Barton et al. | |
| 6,265,071 B1 | 7/2001 | Gross et al. | |
| 6,273,222 B1 | 8/2001 | Rebstock et al. | |
| 6,280,496 B1 | 8/2001 | Kawai et al. | |
| 6,296,045 B1 | 10/2001 | Fox et al. | |
| 6,302,246 B1 | 10/2001 | Naumann et al. | |
| 6,427,755 B1 | 8/2002 | Buckley | |
| 6,446,765 B1 | 9/2002 | Dabertrand et al. | |
| 6,450,303 B1 | 9/2002 | Keck et al. | |
| 6,458,466 B1 | 10/2002 | Jones | |
| 6,467,588 B1 | 10/2002 | Baumgartner et al. | |
| 6,536,564 B1 | 3/2003 | Garfinkel et al. | |
| 6,564,856 B1 | 5/2003 | Buckley | |
| 6,598,716 B1 | 7/2003 | Ihm | |
| 6,626,273 B1 | 9/2003 | Baumgartner et al. | |
| 6,630,247 B1 | 10/2003 | Fox | |
| 6,722,479 B2 | 4/2004 | Baumgartner et al. | |
| 6,739,437 B2 | 5/2004 | Garfinkel et al. | |
| 6,857,509 B1 | 2/2005 | Braiato et al. | |
| 6,910,556 B1 | 6/2005 | Baumgartner et al. | |
| 6,919,127 B2 | 7/2005 | Waggoner et al. | |
| 6,945,309 B2 | 9/2005 | Frait et al. | |
| 7,028,816 B2 | 4/2006 | Baumgartner et al. | |
| 7,096,920 B2 | 8/2006 | Debus et al. | |
| 7,267,882 B2 * | 9/2007 | Breslin et al. | 428/450 |
| 7,410,036 B2 | 8/2008 | Wimmer et al. | |
| 7,578,336 B2 | 8/2009 | Stahl, Jr. et al. | |
| 7,648,932 B2 | 1/2010 | Weisensel et al. | |
| 7,753,103 B1 | 7/2010 | Rochester | |
| 7,762,379 B2 | 7/2010 | Fujita et al. | |
| 7,938,378 B2 | 5/2011 | Hanna et al. | |
| 8,006,740 B2 | 8/2011 | Strom | |
| 8,037,980 B2 | 10/2011 | Pahle | |
| 8,101,283 B2 | 1/2012 | Pyzik et al. | |
| 8,118,079 B2 | 2/2012 | Hanna et al. | |
| 8,132,612 B2 | 3/2012 | Morais et al. | |
| 8,210,232 B2 | 7/2012 | Xia | |
| 8,399,107 B2 | 3/2013 | Pyzik et al. | |
| 8,408,369 B2 | 4/2013 | Woychowski et al. | |
| 8,455,379 B2 | 6/2013 | McCullough et al. | |
| 8,550,145 B2 | 10/2013 | Wood et al. | |
| 8,684,149 B2 | 4/2014 | Mueller | |
| 8,733,517 B2 | 5/2014 | Tironi et al. | |
| 8,739,946 B2 | 6/2014 | Pahle et al. | |
| 8,820,491 B2 | 9/2014 | Hanna | |
| 8,865,607 B2 | 10/2014 | Reilly et al. | |
| 8,905,203 B2 | 12/2014 | Lee et al. | |
| 8,945,466 B2 | 2/2015 | Ishido et al. | |
| 9,038,271 B2 | 5/2015 | Huang et al. | |
| 9,079,241 B2 | 7/2015 | Barber et al. | |
| 9,127,734 B2 | 9/2015 | Hanna et al. | |
| 9,174,274 B2 | 11/2015 | Hanna et al. | |
| 9,249,848 B2 | 2/2016 | Kokott | |
| 9,527,132 B2 | 12/2016 | Lowe et al. | |
| 9,776,241 B2 | 10/2017 | Huang et al. | |
| 2003/0159893 A1 | 8/2003 | Tironi | |
| 2004/0084260 A1 | 5/2004 | Hoyte | |
| 2004/0084261 A1 | 5/2004 | Burgoon et al. | |
| 2004/0151935 A1 | 8/2004 | Dzugan et al. | |
| 2004/0178031 A1 | 9/2004 | Gotti et al. | |
| 2004/0202883 A1 | 10/2004 | Scheydecker et al. | |
| 2005/0183909 A1 | 8/2005 | Rau, III et al. | |
| 2005/0189083 A1 | 9/2005 | Stahl, Jr. et al. | |
| 2006/0016646 A1 | 1/2006 | Banks et al. | |
| 2007/0009754 A1 | 1/2007 | Dzugan et al. | |
| 2007/0170016 A1 | 7/2007 | Yamamoto et al. | |
| 2007/0181390 A1 | 8/2007 | Korm | |
| 2007/0235270 A1 | 10/2007 | Miskinis et al. | |
| 2008/0135359 A1 | 6/2008 | Basirico et al. | |
| 2008/0230940 A1 | 9/2008 | Meier et al. | |
| 2009/0011211 A1 | 1/2009 | Weinstein et al. | |
| 2009/0020383 A1 | 1/2009 | Hanna et al. | |
| 2009/0075056 A1 | 3/2009 | Iwamoto et al. | |
| 2010/0025169 A1 * | 2/2010 | Becker | 188/218 XL |
| 2010/0331166 A1 | 12/2010 | Hidaka et al. | |
| 2011/0003164 A1 | 1/2011 | Menge et al. | |
| 2011/0290602 A1 | 12/2011 | Kleber et al. | |
| 2012/0111674 A1 | 5/2012 | Moore | |
| 2012/0186919 A1 | 7/2012 | Hanna et al. | |
| 2013/0081776 A1 | 4/2013 | Hanna et al. | |
| 2014/0124308 A1 * | 5/2014 | Kim et al. | F16D 65/123 |
| 2014/0158486 A1 | 6/2014 | Schorn et al. | |
| 2014/0199205 A1 | 7/2014 | Kim et al. | |
| 2014/0360633 A1 | 12/2014 | Sato et al. | |
| 2015/0053515 A1 * | 2/2015 | Drewes | F16D 65/123 |
| 2015/0136546 A1 | 5/2015 | Kim et al. | |
| 2015/0184712 A1 | 7/2015 | Kim et al. | |
| 2015/0252451 A1 | 9/2015 | Al-Aqeeli et al. | |
| 2015/0267766 A1 | 9/2015 | Barber et al. | |
| 2015/0285322 A1 | 10/2015 | Wallmeier | |
| 2016/0023951 A1 | 1/2016 | Alessi et al. | |
| 2016/0068934 A1 | 3/2016 | Wood | |
| 2016/0158830 A1 | 6/2016 | Morals et al. | |
| 2016/0273080 A1 | 9/2016 | Tarrant et al. | |
| 2016/0273081 A1 | 9/2016 | Tarrant et al. | |
| 2016/0303650 A1 | 10/2016 | Tarrant et al. | |
| 2017/0074335 A1 | 3/2017 | Wagner | |
| 2017/0074336 A1 | 3/2017 | Burgoon | |
| 2017/0074337 A1 | 3/2017 | Borner et al. | |
| 2019/0003540 A1 * | 1/2019 | Paul | F16D 65/128 |
| 2020/0217377 A1 * | 7/2020 | Milanesi | F16D 65/847 |

FOREIGN PATENT DOCUMENTS

| | | | |
|---|---|---|---|
| DE | 2822379 | 11/1979 | |
| DE | 19807184 | 4/2000 | |
| DE | 19859840 A1 | 7/2000 | |
| DE | 102007001567 A1 | 7/2008 | |
| DE | 102009013358 A1 | 9/2010 | |
| DE | 102010026070 A1 | 1/2011 | |
| EP | 3524843 A1 * | 8/2019 | B22D 19/00 |
| FR | 3028904 | 5/2016 | |
| FR | 3028904 A1 * | 5/2016 | F16D 65/123 |
| WO | 2000032330 | 6/2000 | |

OTHER PUBLICATIONS

Machine translation of FR 3028904 (no date).*
Office Action of U.S. Appl. No. 16/376,196 dated Jul. 30, 2019, 24 pages.
Notice of Allowance of U.S. Appl. No. 16/376,196 dated Oct. 17, 2019, 8 pages.
Office Action of U.S. Appl. No. 15/638,439 dated May 30, 2018, 30 pages.
Edrisy et al. "Wear of thermal spray deposited low carbon steel coatings on aluminum alloys" Wear, 2001, vol. 251, pp. 1023-1033.
Joshi, Parth S. et al., "Manufacturing of Disc Brake Rotor Using Aluminium Metal Matrix Composite (AMMC) reinforced with Silicon Carbide", Imperial Journal of Interdisciplinary Research, 2016, pp. 1195-1200, vol. 6.
Prasad, S.V., "Aluminum metal-matrix composites for automotive applications: tribological considerations", Tribology Letters, Oct. 2004, pp. 445-453, vol. 17, No. 3.
Zuhailawati, H., "Fabrication of Low Cost of Aluminium Matrix Composite Reinforced with Silica Sand", Journal of Physical Science, 2007, pp. 47-55, vol. 18(1).
"Thems Da Brakes . . . " Deanz Rodz & Race Carz, pp. 1-2, http://www.deanzrodzandracecarz.com/karma-ghia__blue_mamba/karma-ghia_pg2.

(56) References Cited

OTHER PUBLICATIONS

Chinese Office Action of Serial No. 201911326150.0 dated Mar. 11, 2021, 8 pages.
Chinese Search Report of CN Serial No. 201911326150.0 dated Feb. 19, 2021, 5 pages.

* cited by examiner

ALUMINUM CERAMIC COMPOSITE BRAKE ASSEMBLY

CROSS REFERENCE TO RELATED APPLICATIONS

This application claims the benefit of U.S. Provisional Application No. 62/786,092, filed Dec. 28, 2018, which is incorporated herein by reference.

BACKGROUND

Aluminum ceramic composite brake rotors are known for use in vehicles as part of a disc brake mechanism. Compared to iron-based brake rotors, aluminum ceramic composite brake rotors are lighter, thereby lowering the overall weight of the vehicle and generating savings in fuel costs. However, these aluminum ceramic composite brake rotors cannot be welded to a metal hub, and therefore present challenges when attaching the rotor to a metal hub and to an axle of a vehicle.

Moreover, these aluminum ceramic composite brake rotors experience some thermal expansion due to the heat generated from friction during a braking operation. This heat causes the aluminum ceramic composite brake rotors to expand and contract at a different rate/amount than does the metal hub, due to differences in the coefficients of thermal expansion of the two materials. The difference in thermal expansion may also result from the hub not being subjected to the same amount of heat as the rotors during braking operations because the hub does not experience friction during braking operations. Such a difference in the expansion between the aluminum ceramic composite brake rotors and the metal hubs must be taken into account when connecting the two components, which presents another challenge when using aluminum ceramic composite brake rotors.

BRIEF DESCRIPTION

According to one aspect, a brake assembly includes a brake rotor and a hub. The brake rotor has an axis of rotation, and includes a central aperture and projections extending radially inward toward the axis. The hub is arranged within the central aperture, and includes through holes spaced about a circumference of the hub. The projections are arranged in the through holes to thereby connect the rotor to the hub. The projections are capable of radially moving with respect to the through holes without disconnecting the rotor from the hub.

In another aspect, a method of making a brake assembly includes providing an aluminum ceramic composite brake rotor having an axis of rotation, and including a central aperture and projections extending radially inward toward the axis. The rotor is arranged in a mold, and a molten aluminum alloy is introduced into the mold. The aluminum alloy is solidified to form a hub arranged within the central aperture of the rotor. The hub includes radial through holes spaced about a circumference of the hub. The projections are arranged in the through holes to thereby connect the rotor to the hub. The projections are capable of radially moving with respect to the through holes without disconnecting the rotor from the hub.

In another aspect, a vehicle includes a brake assembly. The brake assembly includes a brake rotor and a hub. The brake rotor has an axis of rotation, and includes a central aperture and projections extending radially inward toward the axis. The hub is arranged within the central aperture, and includes through holes spaced about a circumference of the hub. The projections are arranged in the through holes to thereby connect the rotor to the hub, and the projections are capable of radially moving with respect to the through holes without disconnecting the rotor from the hub.

DETAILED DESCRIPTION

Figure 1:
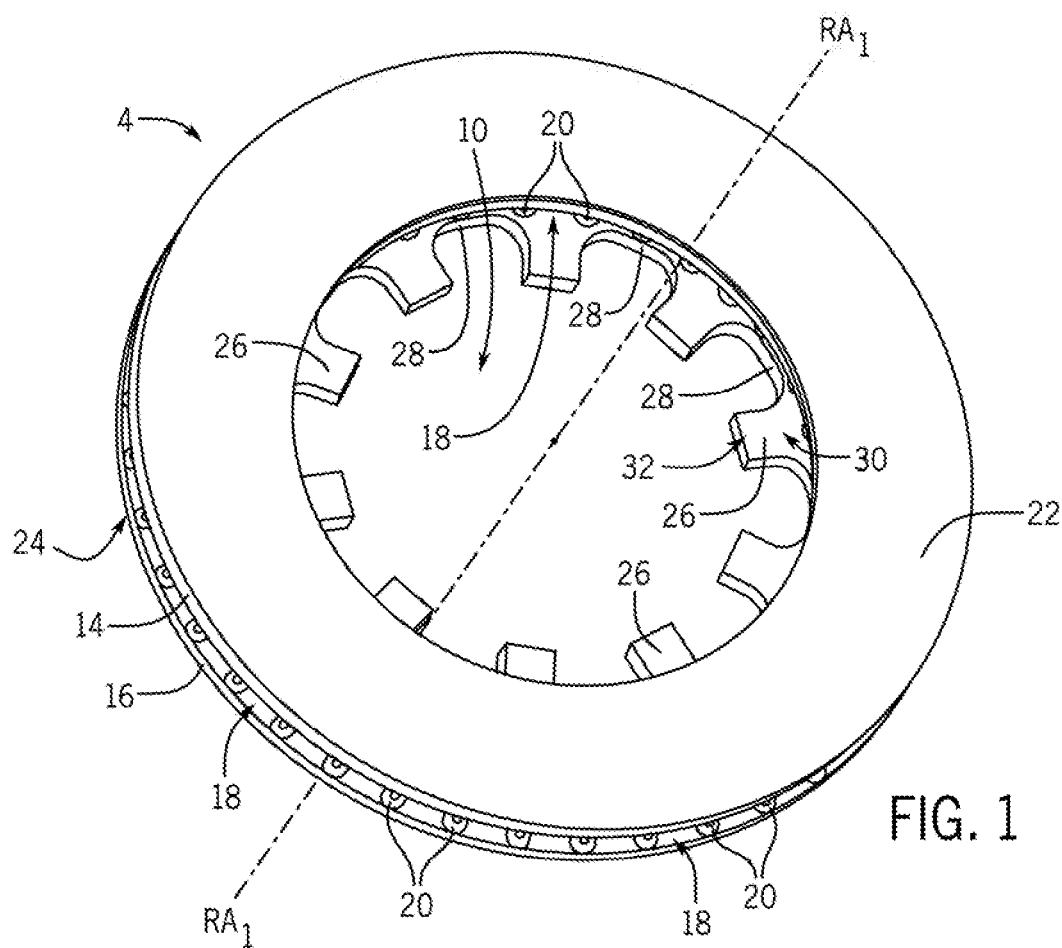
FIG. 1 is a perspective inboard view of a brake rotor in accordance with the present subject matter.
Figure 2:
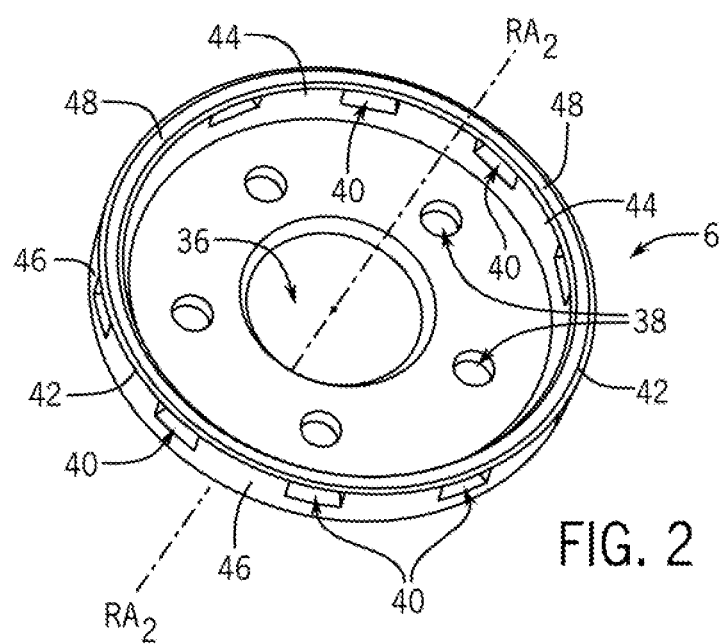
FIG. 2 is a perspective inboard view of a hub in accordance with the present subject matter.
Figure 3:
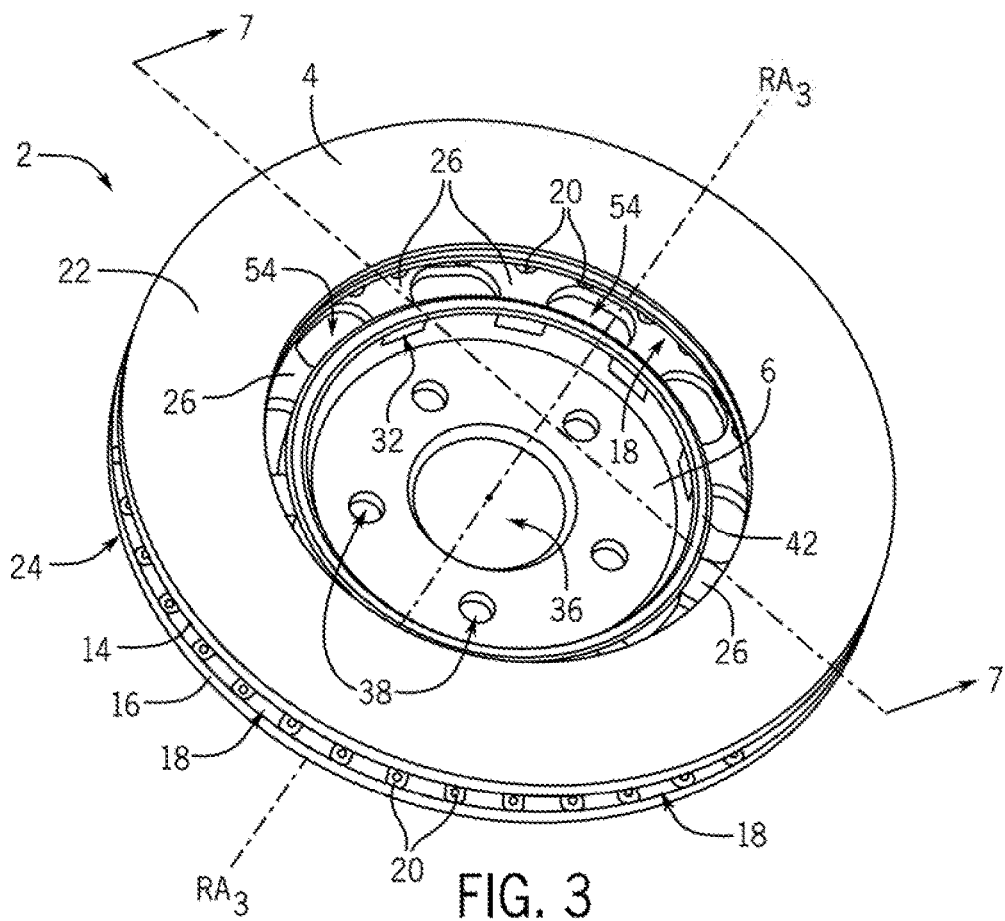
FIG. 3 is a perspective inboard view of a brake assembly including the brake rotor of FIG. 1 and the hub of FIG. 2 in accordance with the present subject matter.
Figure 4:
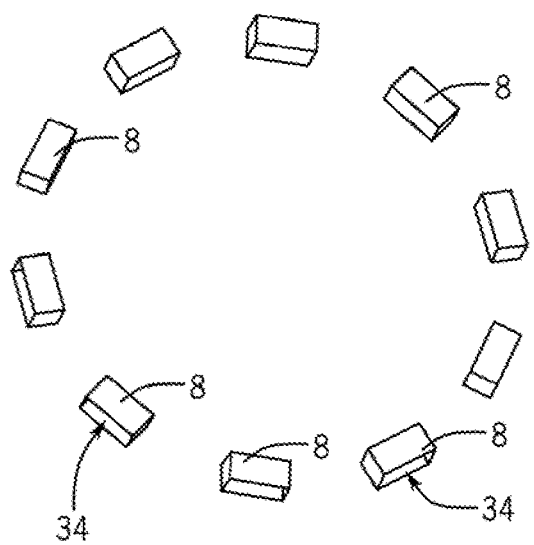
FIG. 4 is a perspective inboard view of coverings in accordance with the present subject matter.

A brake assembly includes a rotor and a hub. The rotor includes a plurality of projections that extend into through holes in the hub. These through holes engage the projections in a way that prevents the rotor from being removed from the hub, but allows for thermal expansion of the rotor (radially inwardly) when the rotor is in use and exposed to elevated temperatures.

Referring to FIGS. 1-10, a brake assembly 2 includes a brake rotor 4 (also referred to as "rotor") and a hub 6, and optionally further includes coverings 8 (FIGS. 4-6, 8, and 9).

The brake assembly 2 may be included on a vehicle as part of a disc brake mechanism, which may further include calipers that squeeze a pair of brake pads against the rotor 4 during braking operations to slow or stop the vehicle. The brake assembly 2 can be included in any type of vehicle, and attached to a rotating shaft, such as a spindle or axle, or a wheel of the vehicle for inhibiting rotation of the shaft or wheel.

The brake rotor 4 may be an integral one-piece unit, or may be a multi-component assembly. The rotor 4 may be made of any suitable material such as, for example, cast grey iron, aluminum, magnesium, or alloys or composites including Aluminum Ceramic Composite ("ACC," also known as aluminum Metal Matrix Composite or aluminum MMC) and the like. In a preferred embodiment, the rotor 4 is formed of an ACC in a sand mold casting process and is an integral one-piece unit. Illustrative ACC's and methods for forming ACC's that may be used for the rotor 4 are disclosed in U.S. Pat. No. 7,267,882, the relevant disclosure of which is hereby incorporated by reference as if fully set forth herein. However, alternative known ACC's and methods of making rotors are contemplated. The rotor 4 may be machined after casting to achieve desired dimensions.

The rotor 4 includes a central aperture 10 which is sized for accepting the hub 6 as depicted in FIGS. 3 and 6-10. The rotor 4 has a rotational axis $RA_1$ about which the rotor 4 rotates when the brake assembly 2 is mounted to a rotating vehicle axle or wheel. The central aperture 10 is centered on the rotational axis $RA_1$.

The rotor 4 includes a first friction plate 14, a second friction plate 16 separated from the first friction plate 14 by a gap 18, and veins 20 arranged in the gap 18 and connecting the two friction plates 14, 16 in a spaced apart configuration. The central aperture 10 extends through the two friction plates 14, 16. The two plates 14, 16 provide respective brake surfaces 22, 24, upon which the brake pads engage when squeezed by calipers during a braking operation to inhibit rotation of the rotor 4. During a braking operation, friction between the brake pads and the surfaces 22, 24 may cause the rotor 4 to heat up. The gap 18 may allow air to circulate between the two plates 14, 16 for dissipating the generated heat to thereby cool the rotor 4 during and after the braking operation.

The rotor 4 includes projections 26 for engaging the hub 6. The central aperture 10 defines a radially inward-facing surface 28 on the second friction plate 16, and the projections 26 may extend radially inward from the surface 28 of the second plate 16 and toward the axis $RA_1$. As used herein, "radial" and cognate terms means diverging in lines from the rotational axis $RA_1$ (or rotational axes $RA_2$ and $RA_3$ discussed in further detail herein) in a plane perpendicular to the rotational axis. Alternatively, the projections 26 may extend instead from the first friction plate 14. The projections 26 may extend from only one of the two friction plates 14, 16. As depicted in the figures, the rotor 4 includes ten identical projections 26 that are evenly spaced about the radially inward-facing surface 28 of the second friction plate 16. However, this is not required, and more or less and different projections 26 can be used and/or the projections 26 can be spaced differently (e.g. randomly spaced) about the radially inward-facing surface 28.

As best depicted in FIGS. 7-10, the projections 26 are axially spaced by a distance D from a line L, which line L is perpendicular to the axis $RA_1$ and which line L extends radially out from the axis $RA_1$ through a center of the gap 18. This configuration of the projections 26 relative to the gap 18 is referred to herein as the projections 26 being "outboard" of the gap 18, which indicates being arranged further from a body of the vehicle that is associated with the brake assembly 2; while "inboard" indicates being arranged nearer to the body of the vehicle. In this axially spaced arrangement, the projections 26 do not block air flowing through the gap 18, since the projections 26 are axially spaced outboard from the line L. This arrangement allows air to freely flow through the gap 18 along line L without being obstructed by the projections 26, and thus allowing air to freely flow between the two friction plates 14, 16 to cool the rotor 4. If the projections 26 were instead in line with line L, e.g. by being thicker in an axial direction, then the projections 26 might inhibit the flow of air through the gap 18 by partially blocking the gap 18, and would thus inhibit cooling of the rotor 4.

Figure 5:
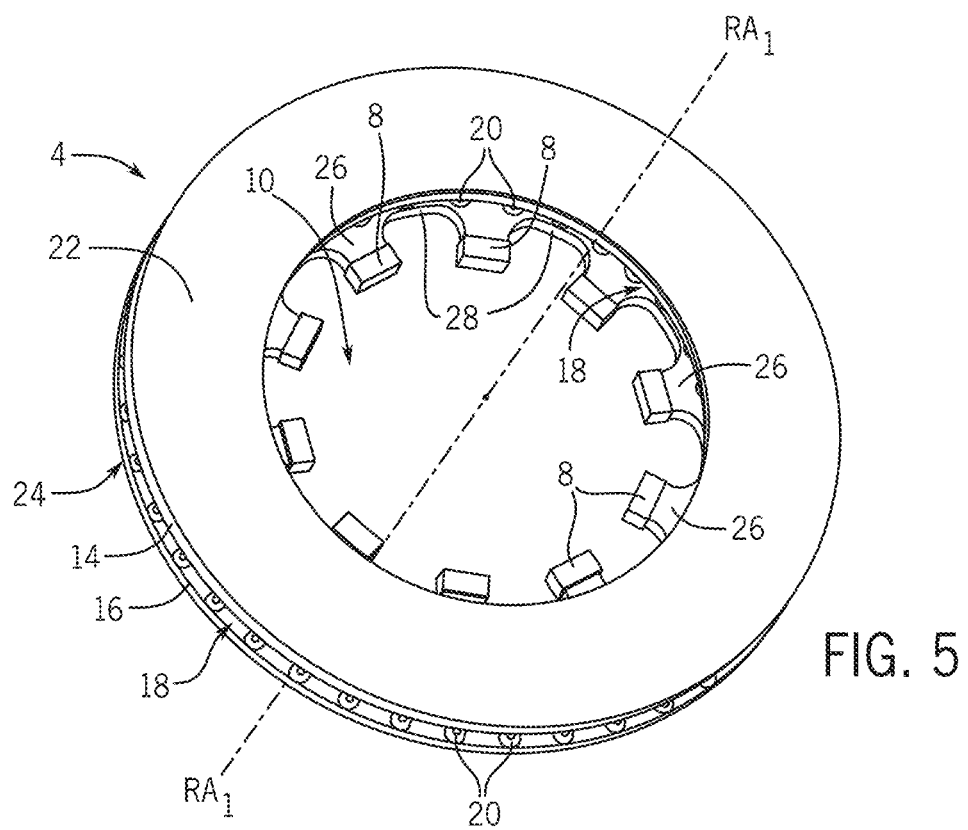
FIG. 5 is a perspective inboard view of a brake rotor including the coverings of FIG. 4 in accordance with the present subject matter.
Figure 6:
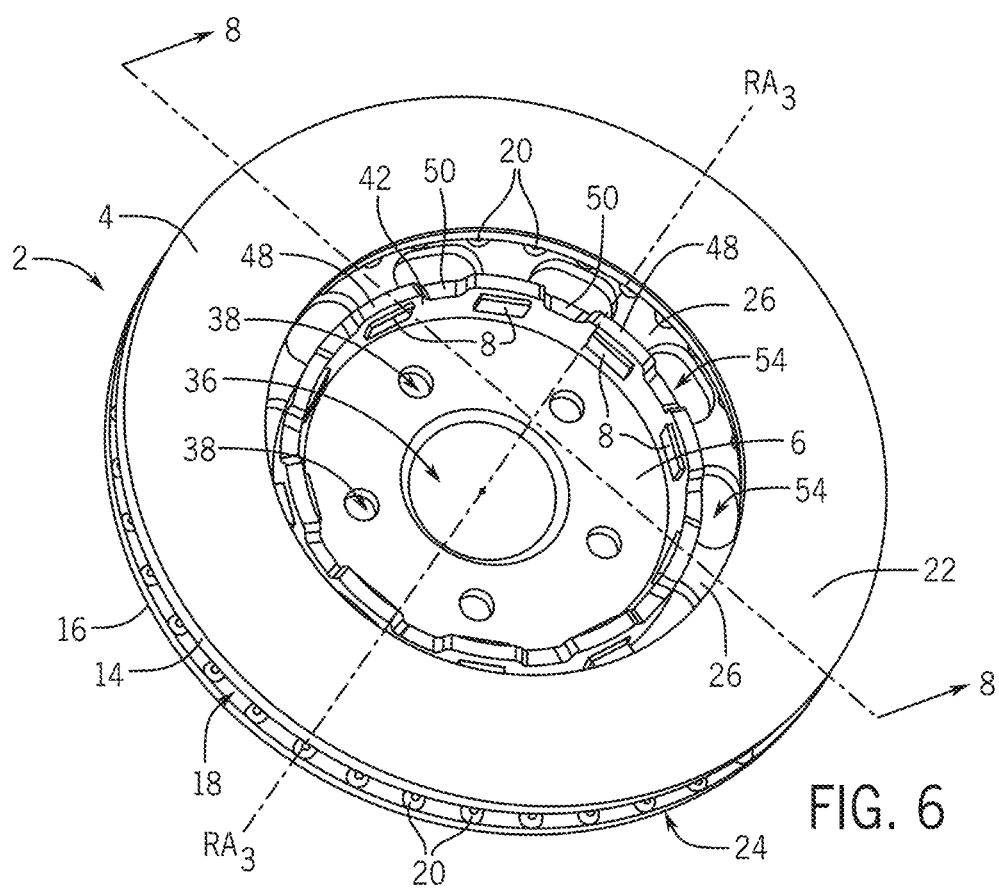
FIG. 6 is a perspective inboard view of a brake assembly including the brake rotor of FIG. 5 in accordance with the present subject matter.
Figure 8:
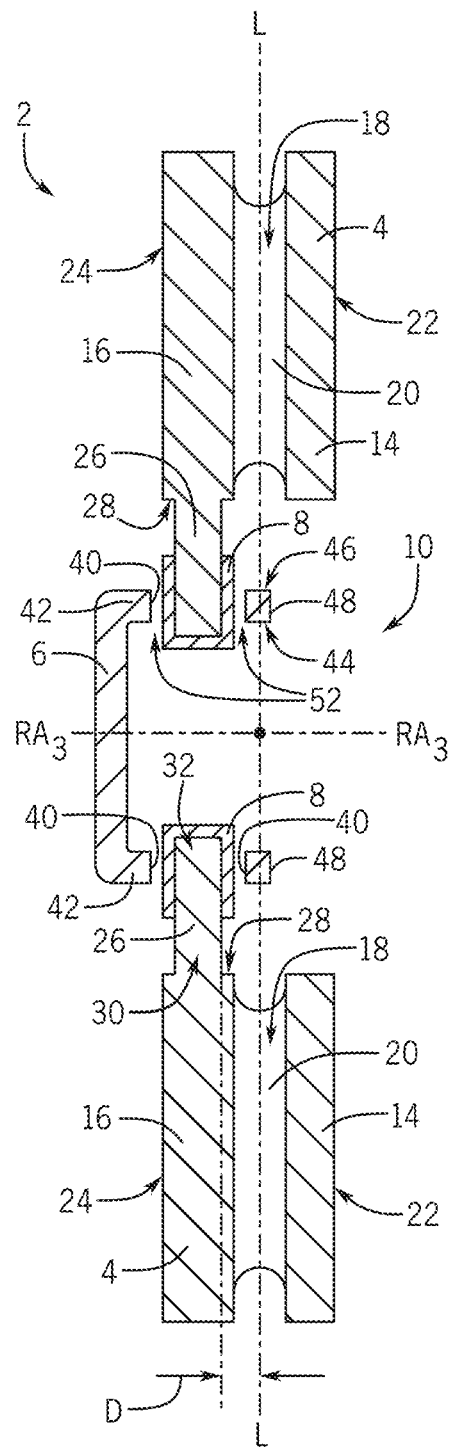
FIG. 8 is a cross-sectional view of the brake assembly of FIG. 6 taken along line 8-8.
Figure 10:
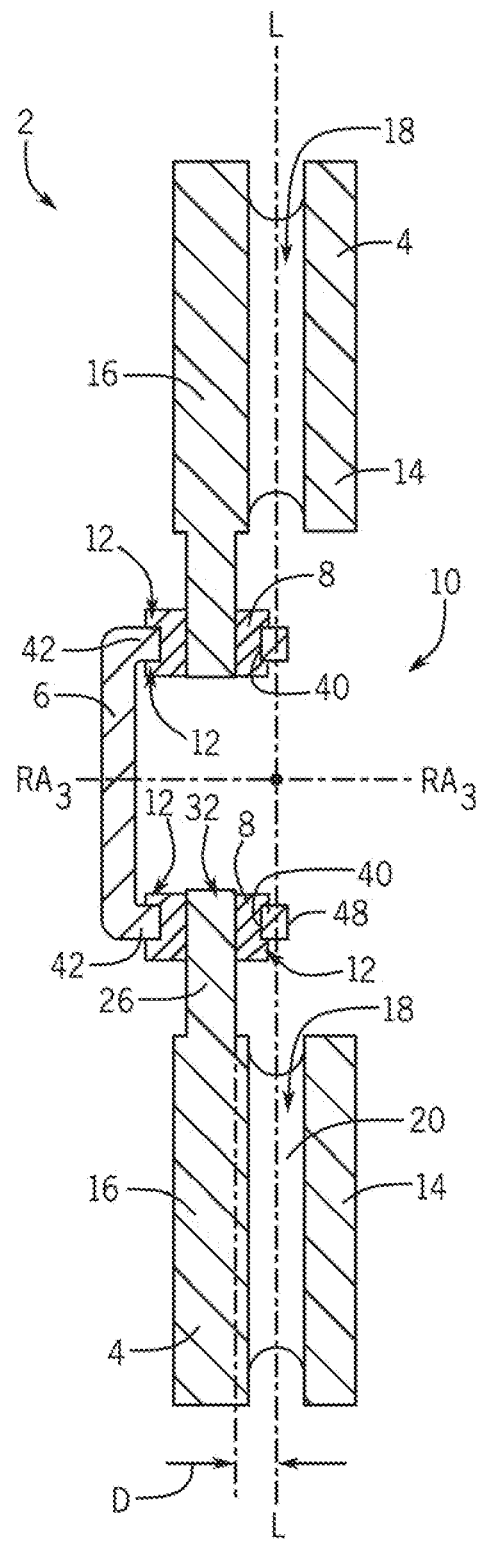
FIG. 10 is a cross-sectional view of a brake assembly in accordance with the present subject matter.

The projections each include a base 30 at one end contacting the radially inward-facing surface 28 of the second friction plate 16, and a tip 32 at the other end engaging the hub 6. In a non-limiting embodiment, the tips 32 of the projections 26 are covered by the coverings 8 (FIGS. 5, 6, 8, and 10). The coverings 8 are arranged on the tips 32 so that the tips 32 do not contact the hub 6 after connecting the rotor 4 and the hub 6 to form of the brake assembly 2. In one embodiment, the coverings 8 completely cover the tips 32 of the projections 26 (FIGS. 5, 6 and 8). In another embodiment, the coverings 8 do not completely cover the tips 32 of the projections 26 (FIG. 10).

The coverings 8 may be formed from an iron-based material, such as steel. The aluminum component in the ACC in the projections 26 may become hot enough during a braking operation to soften or melt. The hub 6 may also comprise aluminum, and thus, heated aluminum in the projections 26 may begin to stick to portions of the hub 6 contacted by the projections 26. Heat from the projections 26 may also transfer to the aluminum in the hub 6, and the projections 26 may therefore further fuse, stick, or otherwise adhere to the hub 6. The coverings 8, being made from iron-based material, may have a higher softening/melting temperature than the aluminum in the ACC material, which may thereby inhibit such fusing, sticking or adherence between the hub 6 and the projections 26. The coverings 8 may comprise other materials, including metals, alloys, ceramics, composites, etc., having a higher melting/softening point than aluminum.

The coverings 8 may be arranged over the tips 32 after the rotor 4 is formed. This application method may be performed by any process including for example, casting, dipping, spraying, electrostatic deposition, thermal spraying, painting, roll coating, flow coating, etc. The coverings 8 may alternatively be provided as stand-alone components in the shape of a box (e.g. FIG. 4) defining an interior for example, having one open side 34 and five closed sides, or other shapes having one open side and being closed on all others to define an interior. In another aspect, the coverings 8 may be in the shape of a sleeve having two open sides (FIG. 10). The coverings 8 may be initially arranged in a mold, and a molten ACC material may then be delivered into the mold. The molten ACC material may fill the inside of the coverings 8. Subsequent solidification of the ACC material will form the rotor 4 with the coverings 8 on the tips 32 of the projections 26. The coverings 8 may include one or more retaining features, such as lips 12, arranged at the outer and/or inner radius of the hub 6 to prevent removal of the coverings 8 from the through holes 40.

The hub 6 is arranged in the central aperture 10 of the rotor 4, and itself includes a central hole 36, through which a vehicle axle can be inserted for example. The hub 6 may further include additional holes 38, through which threaded studs can be inserted for securing the hub 6 to a vehicle. The hub 6 has a rotational axis $RA_2$ about which the hub 6 rotates when the brake assembly 2 is mounted to a rotating vehicle axle or wheel. The central hole 36 is centered on the rotational axis $RA_2$. When the hub 6 is arranged in the central aperture 10 of the rotor 4 and connected to the rotor 4, the rotational axis $RA_2$ may be collinear to the rotational axis $RA_1$ of the rotor 4, both of which are collinear to a rotational axis $RA_3$ of the brake assembly 2. In this regard, the brake assembly 2 includes the rotational axis $RA_3$ about which the brake assembly 2 rotates when the brake assembly 2 is mounted to a rotating vehicle axle or wheel. The rotational axis $RA_1$ and the rotational axis $RA_2$ correspond to (i.e. are collinear to) the rotational axis $RA_3$ when the rotor 4 and the hub 6 are connected to form the brake assembly 2.

The hub 6 may be made of any suitable material such as for example, cast grey iron, aluminum, magnesium, or alloys or composite materials. In a preferred embodiment, the hub 6 is cast from an aluminum material, for example an aluminum alloy or aluminum metal. The hub 6 may be cast by inserting the rotor 4 into a mold along with a sand core, and delivering a molten aluminum material into the mold. The aluminum material is solidified to form the hub 6, which is thereby connected with the rotor 4 as described below in more detail.

The hub 6 includes through holes 40 spaced about a circumference of the hub 6, and which mate with the projections 26 to secure the hub 6 and the rotor 4 to each other. The through holes 40 are arranged in a rim 42 that extends around a periphery of the hub 6. The through holes 40 are arranged in a spaced apart configuration on the rim 42, so as to radially align with the projections 26 on the rotor 4 for engaging with the projections 26. The rim 42 includes a radially inward-facing side 44 and a radially outward-facing side 46, and the through holes 40 extend completely through the rim 42 from the radially inward-facing side 44 to the radially outward-facing side 46. A direction of each of the through holes 40 is the direction in which each extends through the rim 42 between the radially inward-facing side 44 and the radially outward-facing side 46, rather than the through holes 40 extending in an axial direction. The direction of each of the through holes 40 may be perpendicular to the radially inward-facing side 44 and to the radially outward-facing side 46, and may be radial to the rotation axis $RA_2$ in a plane perpendicular to the rotation axis $RA_2$.

An inboard edge 48 of the rim 42 may be continuous, i.e. flat (FIG. 2), or may include depressions 50 (FIG. 6) spaced apart around the edge 48 and arranged circumferentially between the through holes 40. The depressions 50 may allow for an increased airflow through the gap 18 than that provided by a rim 42 with a flat edge 48.

When the hub 6 and rotor 4 are connected, e.g. by casting the hub 4 to be arranged in the central aperture 10 of the rotor 4, the projections 26 on the rotor 4 are at least partially arranged in the through holes 40 to connect the rotor 4 to the hub 6. The projections 26 extend through the through holes 40 from the radial outside of the through holes 40 toward the rotational axis $RA_3$.

Figure 7:
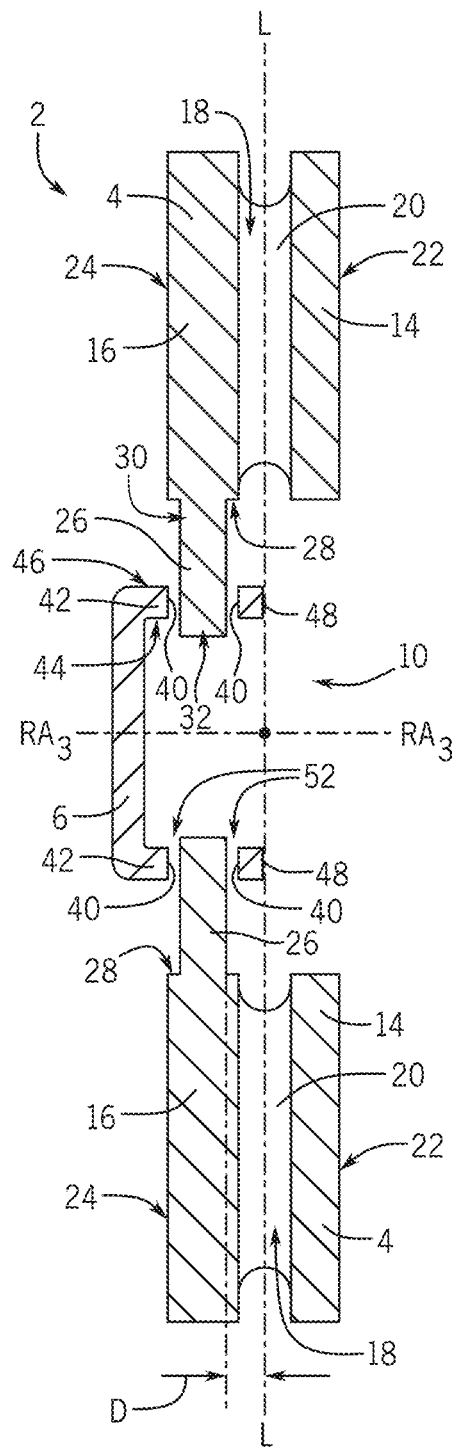
FIG. 7 is a cross-sectional view of the brake assembly of FIG. 3 take along line 7-7.
Figure 9:
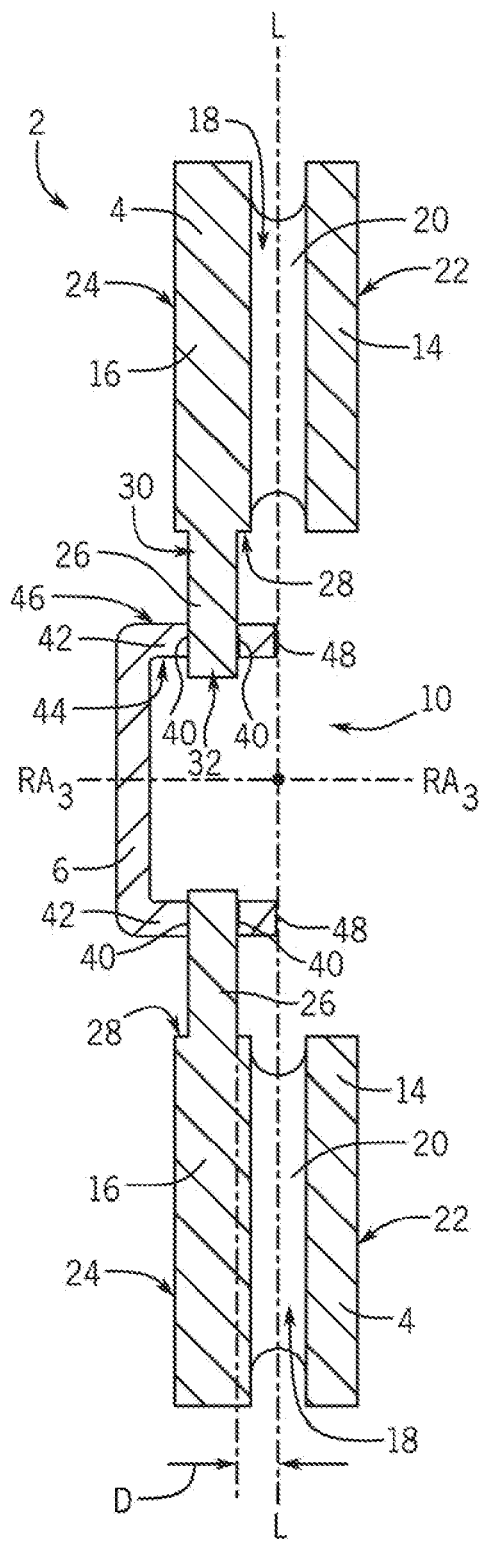
FIG. 9 is a cross-sectional view of a brake assembly in accordance with the present subject matter.

The projections 26 (with or without coverings 8) and through holes 40 may or may not be tightly fitted together, and the projections 26 may be capable of radially moving with respect to the through holes 40 without disconnecting the rotor 4 from the hub 6. In other words, the mating of the projections 26 and the through holes 40 may not result from a fixed connections between the projections 26 and the through holes 40. Instead, the connection between the projections 26 and the through holes 40 may allow some amount of radial movement of the projections 26 relative to the through holes 40. The cross-sectional sizes of the projections 26 (or coverings 8 if included) may be slightly smaller than that of the through holes 40 to provide a clearance 52 between the projections 26 (or coverings 8 if included) e.g. as shown in FIGS. 7-8; or there may be a snug fit with no clearance between the projections 26 (or coverings 8 if included) e.g. as shown in FIGS. 9-10. When the coverings 8 are included, the cross-sectional sizes of the coverings 8 may be smaller than that of the through holes 40, to provide the clearance 52 between the coverings 8 and the through holes 40 (FIG. 8). As will be understood, the projections 26 (or coverings 8 if included) may also be snugly fit into the through holes 40 as depicted in FIGS. 9-10. These arrangements including or not including clearances 52, may result in non-fixed contact between the projections 26 (or coverings 8 if included) and the through holes 40. Such non-fixed contact between the projections 26 radially with respect to the through holes 40 may allow for movement of the projections 26 radially with respect to the through holes 40. Such movement of the projections 26 relative to the through holes 40 may be caused by thermal expansion of the rotor 4 and the projections 26 from the heat generated during a braking operation. Alternatively, if the coverings 8 are included as shown in FIG. 10 having two open ends, the projections 26 may be able to radially move with respect to the coverings 8, which may be fixed relative to the through holes 40 by lips 12.

The exemplary brake assembly 2 is subjected to high mechanical and thermal stresses in practical applications, the thermal stresses increasing generally in proportion to the temperature. Because the rotor 4 is subject to direct heat from friction during a braking operation and because of the significantly different coefficients of thermal expansion of the aluminum hub 6 and the ACC rotor 4, the rotor 4 may expand at a faster rate than the hub 6. Therefore, the loose connection and the clearance 52 between the projections 26 and the through holes 40 allows for thermal expansion of the rotor 4 when heated. Therefore, the thermal stresses of the rotor 4 can be reduced compared to known designs when the temperature is raised or lowered.

The projections 26 can extend partially through the through holes 40 so that the tips 32 of the projections 26 do not extend radially inside the radially inward-facing side of the rim 42; or the projections 26 can extend all the way through the rim 42 so that the tips 32 of the projections 26 do extend radially inside the radially inward-facing side of the rim 42. During heating and subsequent cooling, the projections 26 can expand and contract in a radial direction so that the tips 32 are between these two positions. The hub 6 is sized relative to the rotor 4 so that the projections 26 cannot contract from being cooled, so that all of the projections 26 are fully removed from being inside the through holes 40. That is, the tips 32 of the projections 26 are always arranged radially inside the radially outward-facing side 46 of the rim 42. In this way, each of the projections 26 may be inhibited from being removed from the corresponding through hole 40 due to the connections formed between the other projections 26 and their corresponding through holes 40. Additionally, when the coverings 8 are included on the projections 26, the coverings 8 may have a retaining feature (e.g. lips 12) that inhibits their removal from the through holes 40.

The brake assembly 2 may include bores 54 formed between the projections 26 and the rim 42 as depicted. These bores 54 can extend in an axial direction through the brake assembly 2 and may allow air to flow therethrough or help air to flow through the gap 18 to help cool the brake assembly 2, including the rotor 4.

A method of making a brake assembly 2 includes providing the aluminum ceramic composite brake rotor 4, which may be formed by casting an ACC material. The rotor 4 is placed in a mold along with a sand core. Molten aluminum or aluminum alloy may be introduced into the mold and solidified to form the hub 6, which will be arranged within the central aperture 10 of the rotor 4 and which will include the through holes 40. The projections 26 are arranged in the through holes 40 to thereby connect the rotor 4 to the hub 6.

The method may include arranging coverings 8 (e.g. iron-based coverings) on the projections 26 such that coverings 8 prevent the projections 26 from contacting the hub 6.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A brake assembly comprising:
a one piece brake rotor having an axis of rotation, and including a central aperture and projections extending radially inward toward the axis, the projections being without an internal cavity;
a hub arranged within the central aperture, and including through holes spaced about a circumference of the hub; and
coverings arranged on the projections;
wherein the projections are arranged in the through holes to thereby connect the rotor to the hub;
wherein the projections are capable of radially moving with respect to the through holes without disconnecting the rotor from the hub,
wherein when heated, the projections expand radially inward through the through holes,
wherein the coverings prevent the projections from contacting the hub,
wherein the coverings completely cover tips of the projections, and
wherein a clearance is provided between the coverings and the through holes to thereby allow for radial movement of the coverings and the projections with respect to the through holes.

2. The brake assembly according to claim 1, wherein:
the rotor includes a radially inward facing surface from which the projections extend radially inward toward the axis; and
a direction of each of the through holes is radial to the axis.

3. The brake assembly according to claim 1, wherein the projections extend completely through the through holes.

4. The brake assembly according to claim 1, wherein a clearance is provided between the projections and the through holes so as to allow for radial movement of the projections with respect to the through holes.

5. The brake assembly according to claim 1, wherein:
the rotor includes two friction plates separate by a gap and joined by veins arranged in the gap; and
the projections extend from only one of the two friction plates and are axially spaced from the gap.

6. The brake assembly according to claim 1, wherein:
the hub includes a rim in which the through holes are arranged; and
the projections extend through the rim.

7. The brake assembly according to claim 6, wherein:
the rim includes a radially inward-facing side and a radially outward-facing side; and
the projections extend through the rim from the radially outward-facing side to the radially inward-facing side.

8. A method of making a brake assembly comprising:
providing a one-piece aluminum ceramic composite brake rotor having an axis of rotation, and including a central aperture and projections extending radially inward toward the axis, the projections being without an internal cavity;
arranging coverings on the projections;
arranging the rotor in a mold;
introducing a molten aluminum alloy into the mold; and
solidifying the aluminum alloy to form a hub arranged within the central aperture of the rotor, the hub including through holes spaced about a circumference of the hub;
wherein the projections are arranged in the through holes to thereby connect the rotor to the hub;
wherein the projections are capable of radially moving with respect to the through holes without disconnecting the rotor from the hub;
wherein when heated, the projections expand radially inward through the through holes;
wherein the coverings prevent the projections from contacting the hub;
wherein the coverings completely cover tips of the projections; and
wherein a clearance is provided between the coverings and the through holes to thereby allow for radial movement of the coverings and the projections with respect to the through holes.

9. The method according to claim 8, wherein the rotor includes a radially inward facing surface from which the projections extend radially inward toward the axis.

10. The method according to claim 8, wherein a clearance is provided between the projections and the through holes to thereby allow for radial movement of the projections with respect to the through holes.

11. The method according to claim 8, wherein:
the rotor includes two friction plates separate by a gap and joined by veins arranged in the gap; and
the projections extend from only one of the two friction plates and are axially spaced from the gap.

12. The method according to claim 8, wherein the hub includes a circumferential rim in which the through holes are arranged.

13. The method according to claim 12, wherein:
the rim includes depressions in an edge of the rim, and
the depression are arranged circumferentially between the through holes.

14. A brake assembly comprising:
a one-piece brake rotor having an axis of rotation, and including a central aperture and projections extending radially inward toward the axis, the projections being without an internal cavity;
a hub arranged within the central aperture, and including through holes spaced about a circumference of the hub; and
coverings arranged on the projections;
wherein the projections are arranged in the through holes to thereby connect the rotor to the hub;
wherein the rotor includes a first friction plate, and a second friction plate separated from the first friction plate by a gap;
wherein the projections are axially spaced outboard from the gap;
wherein the projections expand radially inward through the through holes when heated;
wherein the coverings prevent the projections from contacting the hub;
wherein the coverings completely cover tips of the projections; and
wherein a clearance is provided between the coverings and the through holes to thereby allow for radial movement of the coverings and the projections with respect to the through holes.

15. The vehicle according to claim 14, wherein the projections are capable of radially moving with respect to the through holes without disconnecting the rotor from the hub.

\* \* \* \* \*